United States Patent
Long et al.

(10) Patent No.: US 8,499,022 B1
(45) Date of Patent: *Jul. 30, 2013

(54) COMBINING MULTIPLE CLUSTERINGS BY SOFT CORRESPONDENCE

(75) Inventors: Bo Long, Palo Alto, CA (US); Zhongfei Mark Zhang, Vestal, NY (US)

(73) Assignee: The Research Foundation of State University of New York, Binghamton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,100

(22) Filed: May 21, 2012

Related U.S. Application Data

(63) Continuation of application No. 11/945,956, filed on Nov. 27, 2007, now Pat. No. 8,195,734.

(60) Provisional application No. 60/867,288, filed on Nov. 27, 2006.

(51) Int. Cl.
*G06F 7/32* (2006.01)
(52) U.S. Cl.
USPC .......................................................... 708/520
(58) Field of Classification Search
USPC .......................................................... 708/520
See application file for complete search history.

(56) References Cited

U.S. PATENT DOCUMENTS

| | | | | |
|---|---|---|---|---|
| 7,617,115 | B2 * | 11/2009 | McNair | 705/3 |
| 2007/0282785 | A1 * | 12/2007 | Fayyad et al. | 707/1 |

\* cited by examiner

*Primary Examiner* — Tan V. Mai
(74) *Attorney, Agent, or Firm* — Steven M. Hoffberg; Ostrolenk Faber LLP

(57) ABSTRACT

Combining multiple clusterings arises in various important data mining scenarios. However, finding a consensus clustering from multiple clusterings is a challenging task because there is no explicit correspondence between the classes from different clusterings. Provided is a framework based on soft correspondence to directly address the correspondence problem in combining multiple clusterings. Under this framework, an algorithm iteratively computes the consensus clustering and correspondence matrices using multiplicative updating rules. This algorithm provides a final consensus clustering as well as correspondence matrices that gives intuitive interpretation of the relations between the consensus clustering and each clustering from clustering ensembles. Extensive experimental evaluations demonstrate the effectiveness and potential of this framework as well as the algorithm for discovering a consensus clustering from multiple clusterings.

20 Claims, No Drawings

COMBINING MULTIPLE CLUSTERINGS BY SOFT CORRESPONDENCE

RELATED APPLICATIONS

This application is a Continuation of U.S. patent application Ser. No. 11/945,956, filed Nov. 27, 2007, issued as patent U.S. Pat. No. 8,195,734 issued Jun. 5, 2012, which claims benefit of priority from U.S. Provisional Patent Application No. 60/867,288, filed Nov. 27, 2006, the entirety of which are expressly incorporated herein by reference.

GOVERNMENT RIGHTS

The United States Government has rights in this invention pursuant to Contract No. FA8750-04-1-0234 between the United States Air Force Research Laboratory (AFRL) and Research Foundation of State University of New York.

BACKGROUND OF THE INVENTION

1. Introduction

Clustering is a fundamental tool in unsupervised learning that is used to group together similar objects [2], and has practical importance in a wide variety of applications. Recent research on data clustering increasingly focuses on cluster ensembles [15, 16, 17, 6], which seek to combine multiple clusterings of a given data set to generate a final superior clustering. It is well known that different clustering algorithms or the same clustering algorithm with different parameter settings may generate very different partitions of the same data due to the exploratory nature of the clustering task. Therefore, combining multiple clusterings to benefit from the strengths of individual clusterings offers better solutions in terms of robustness, novelty, and stability [17, 8, 15].

Distributed data mining also demands efficient methods to integrate clusterings from multiple distributed sources of features or data. For example, a cluster ensemble can be employed in privacy-preserving scenarios where it is not possible to centrally collect all the features for clustering analysis because different data sources have different sets of features and cannot share that information with each other.

Clustering ensembles also have great potential in several recently emerged data mining fields, such as relational data clustering. Relational data typically have multi-type features. For example, Web document has many different types of features including content, anchor text, URL, and hyperlink. It is difficult to cluster relational data using all multi-type features together. Clustering ensembles provide a solution to it.

Combining multiple clusterings is more challenging task than combining multiple supervised classifications since patterns are unlabeled and thus one must solve a correspondence problem, which is difficult due to the fact that the number and shape of clusters provided by the individual solutions may vary based on the clustering methods as well as on the particular view of the data presented to that method. Most approaches [15, 16, 17, 6] to combine clustering ensembles do not explicitly solve the correspondence problem. Re-labeling approach [14, 7] is an exception. However, it is not generally applicable since it makes a simplistic assumption of one-to-one correspondence.

Some early works on combining multiple clusterings were based on co-association analysis, which measure the similarity between each pair of objects by the frequency they appear in the same cluster from an ensemble. Kellam et al. [13] used the co-association matrix to find a set of so-called robust clusters with the highest value of support based on object co-occurrences. Fred [9] applied a voting-type algorithm to the co-association matrix to find the final clustering. Further work by Fred and Jain [8] determined the final clustering by using a hierarchical (single-link) clustering algorithm applied to the co-association matrix. Strehl and Ghosh proposed Cluster-Based Similarity Partitioning (CSPA) in [15], which induces a graph from a co-association matrix and clusters it using the METIS algorithm [11]. The main problem with co-association based methods is its high computational complexity which is quadratic in the number of data items, i.e., $\mathcal{O}(N^2)$.

Re-labeling approaches seek to directly solve the correspondence problem, which is exactly what makes combining multiple clusterings difficult. Dudoit [14] applied the Hungarian algorithm to re-labeling each clustering from a given ensemble with respect to a reference clustering. After overall consistent re-labeling, voting can be applied to determining cluster membership for each data item. Dimitriadou et al. [5] proposed a voting/merging procedure that combines clusterings pair-wise and iteratively. The correspondence problem is solved at each iteration and fuzzy membership decisions are accumulated during the course of merging. The final clustering is obtained by assigning each object to a derived cluster with the highest membership value. A re-labeling approach is not generally applicable since it assumes that the number of clusters in every given clustering is the same as in the target clustering.

Graph partitioning techniques have been used to solve for the clustering combination problem under different formulations. Meta-CLustering Algorithm (MCLA) [15] formulates each cluster in a given ensemble as a vertex and the similarity between two clusters as an edge weight. The induced graph is partitioned to obtain metaclusters and the weights of data items associated with the metaclusters are used to determine the final clustering. [15] also introduced HyperGraph Partitioning algorithm (HGPA), which represents each cluster as a hyperedge in a graph where the vertices correspond to data items. Then, a Hypergraph partition algorithm, such as HMETIS [10], is applied to generate the final clustering. Fern et al. [6] proposed the Hybrid Bipartite Graph Formulation (HBGF) to formulate both data items and clusters of the ensemble as vertices in a bipartite graph. A partition of this bi-partite graph partitions the data item vertices and cluster vertices simultaneously and the partition of the data items is given as the final clustering.

Another common method to solve for the clustering combination problem is to transform it into a standard clustering task by representing the given ensemble as a new set of features and then using a clustering algorithm to produce the final clustering. Topchy et al. [16] applied the k-means algorithm in the new binary feature space which is specially transformed from cluster labels of a given ensemble. It is also shown that this procedure is equivalent to maximizing the quadratic mutual information between the empirical probability distribution of labels in the consensus clustering and the labels in the ensemble. In [17], a mixture model of multinomial distributions is used to do clustering in the feature space induced by cluster labels of a given ensemble. A final clustering is found as a solution to the corresponding maximum likelihood problem using the EM algorithm.

To summarize, the problem of combining multiple clusterings has been approached from combinatorial, graph-based or statistical perspectives. However, there is no sufficient research on the core problem of combining multiple clusterings, the general correspondence problem. The main trend of the recent research is to reduce the original problem to a new clustering task which can be solved by one existing clustering algorithm, such as the hierarchical clustering, graph partitioning, k-means, and the model-based clustering. However, this procedure brings back the problems resulting from the explanatory nature of the clustering task, such as the problem of robustness. Moreover, the heuristic nature of this procedure makes it difficult to develop a unified and solid theoretic framework for ensemble clustering [3].

SUMMARY OF THE INVENTION

2. Overview

The present invention presents a new framework, based on soft correspondence, to directly address the correspondence problem of clustering ensembles. By the concept of soft correspondence, a cluster from one clustering corresponds to each cluster from another clustering with different weight. Under this framework, a correspondence matrix is defined which is an optimal solution to a given distance function that results in a new consensus function. Based on the consensus function, an algorithm is proposed that iteratively computes the consensus clustering and correspondence matrices using multiplicative updating rules. There are three main advantages to the approach according to the present invention: (1) It directly addresses the core problem of combining multiple clusterings, the correspondence problem, which has theoretic as well as practical importance; (2) Except for a final consensus clustering, the algorithm also provides correspondence matrices that give intuitive interpretation of the relations between the consensus clustering and each clustering from a clustering ensemble, which may be desirable in many application scenarios; and (3) it is simple for the algorithm to handle clustering ensembles with missing labels. This work is reported in Long, Bo, Zhang, Zhongfei (Mark), Yu, Philip S., "Combining Multiple Clusterings by Soft Correspondence", Fifth IEEE International Conference on Data Mining, pp. 8-15 (27-30 Nov. 2005), expressly incorporated herein by reference.

From the perspective of matrix computation, the present invention seeks to solve the problem of combining multiple clusterings by directly addressing the general correspondence problem.

Clustering is a fundamental tool in unsupervised learning that is used to group together similar objects, and has practical importance in a wide variety of applications. It is well known that different clustering algorithms or the same clustering algorithm with different parameter settings may generate very different partitions of the same data due to the exploratory nature of the clustering task.

Therefore, combining multiple clusterings to benefit from the strengths of individual clusterings offers better solutions in terms of robustness, novelty, and stability.

Distributed data mining also demands efficient methods to integrate clusterings from multiple distributed sources of features or data.

For example, a cluster ensemble can be employed in privacy-preserving scenarios where it is not possible to centrally collect all the features for clustering analysis because different data sources have different sets of features and cannot share that information with each other.

Clustering ensembles also have great potential in several recently emerged data mining fields, such as relational data clustering. Relational data typically have multi-type features. For example, web documents have many different types of features including content anchor text, URLs, and hyperlinks. It is difficult to cluster relational data using all multi-type features together. Clustering ensembles, however, provide a solution to enable this sort of analysis.

Combining multiple clusterings is more challenging task than combining multiple supervised classifications, since patterns are unlabeled, and thus one must solve a correspondence problem, which is difficult due to the fact that the number and shape of clusters provided by the individual solutions may vary based on the clustering methods as well as on the particular view of the data presented to that method. Most approaches to combine clustering ensembles do not explicitly solve the correspondence problem. The re-labeling approach is an exception. However, it is not generally applicable since it makes a simplistic assumption of one-to-one correspondence.

DETAILED DESCRIPTION OF THE PREFERRED EMBODIMENT

3. Soft Correspondence Formulation

Given a set of data points $X=\{x_1, x_2, \ldots x_n\}$, a clustering of these n objects into k clusters can be represented as a membership matrix $M \in \mathbb{R}^{n \times k}$, where $M_{ij} \geq 0$ and $\Sigma_j M_{ij}=1$, i.e., the sum of the elements in each row of M equals to 1. $M_{ij}$ denotes the weight of the $i^{th}$ points associated with the $j^{th}$ cluster. For a hard clustering, M is an indicator matrix, i.e., $M_{ij}=1$ indicates that the $i^{th}$ point belongs to the $j^{th}$ cluster.

The re-labeling approach tries to solve for the correspondence problem by assuming the one-to-one correspondence between clusters from two clusterings. This assumption makes it only applicable in a special situation where the number of clusters in each given clustering is the same as in the target clustering. Even the number of clusters in two clusterings are the same, if their distributions of the clusters are very different and unbalanced, the one-to-one correspondence is not an efficient representation of the relation between the two clusterings, since it misses too much information.

The present invention employs soft correspondence to formulate the relation between two clusterings. Soft correspondence means that a cluster of a given clustering corresponds to every clusters in another clustering with different weights. Hence, the corresponding relation between two clusterings may be formulated as a matrix. It is called a (soft) correspondence matrix, denoted as S. $S_{ij}$ denotes the weight of the $i^{th}$ cluster of the source clustering corresponding to the $j^{th}$ cluster of the target clustering and $$\sum_j S_{ij} = 1.$$

Under the re-labeling framework, after the label correspondence is obtained, a "re-label" operation is applied and then the labels of two clusterings have consistent meanings. Similarly, under the soft correspondence framework, an operation is required, which is based on the correspondence matrix, to transform the membership matrix of a source clustering into the space of the membership matrix of the target clustering to make the two membership matrices reach a consistent meaning. The intuitive choice of this operation is the linear transformation with the correspondence matrix.

Let $M^{(o)}$ denote the membership matrix of a source clustering, M denote the membership matrix of a target clustering, and S denote the correspondence matrix of $M^{(o)}$ with respect to M. Multiplied by S, $M^{(o)}$ is linearly transformed into the space of M, i.e., $M^{(o)}S$ is the transformed membership matrix that has the consistent meaning with M.

As a next step, an objective function is employed to decide which correspondence matrix is optimal. The distance function for matrices is a good choice, since the smaller the distance between the target membership matrix M and the transformed membership matrix $M^{(0)}S$, the more precisely the correspondence matrix catches the relation between $M^{(0)}$ and M.

The formal definition of the correspondence matrix is provided below.

Definition 3.1. Given a matrix distance function d and two membership matrices, $M^{(0)} \in \mathbb{R}^{n \times k_0}$ and $M \in \mathbb{R}^{n \times k}$, the correspondence matrix, $S \in \mathbb{R}^{k_0 \times k}$, of $M^{(0)}$ with respect to M is the minimizer of $d(M, M^{(0)}, S)$ under the constraints $S_{ij} \geq 0$ and $\Sigma_j S_{ij} = 1$, where $1 \leq i \leq k_0$ and $1 \leq k \leq k$.

The Euclidean distance, a widely used distance function, is adopted herein, although it is understood that other distance functions might be employed as appropriate. Therefore, the correspondence matrix of $M^{(0)}$ with respect to M is given as $$S = \arg\min_{Y} \|M - M^{(0)} Y\|^2, \quad (1)$$

where $\|\cdot\|$ denotes Frobenius matrix norm.

The above formulation is illustrated with examples. Suppose three hard clusterings for six data points are given as the following label vectors.

$\lambda = (1, 1, 2, 2, 3, 3)$
$\lambda^{(1)} = (3, 3, 1, 1, 2, 2)$
$\lambda^{(2)} = (1, 1, 1, 1, 2, 2)$ Let M, $M^{(1)}$, and $M^{(2)}$ denote the membership matrices of the above three clusterings, respectively. Assume $\lambda$ is the target clustering. Let $S^{(1)}$ and $S^{(2)}$ denote the correspondence matrices of $M^{(1)}$ and $M^{(2)}$ with respect to M respectively. M, $M^{(1)}$, and $S^{(1)}$, which is computed based on (1), are given as follows, respectively.

$$\begin{bmatrix} 1 & 0 & 0 \\ 1 & 0 & 0 \\ 0 & 1 & 0 \\ 0 & 1 & 0 \\ 0 & 0 & 1 \\ 0 & 0 & 1 \end{bmatrix}, \begin{bmatrix} 0 & 0 & 1 \\ 0 & 0 & 1 \\ 1 & 0 & 0 \\ 1 & 0 & 0 \\ 0 & 1 & 0 \\ 0 & 1 & 0 \end{bmatrix}, \begin{bmatrix} 0 & 1 & 0 \\ 0 & 0 & 1 \\ 1 & 0 & 0 \end{bmatrix}$$

Examination of the label vectors reveals that there is a perfect one-to-one correspondence relationship between $\lambda$ and $\lambda^{(1)}$. Therefore, we expect the distance between the target membership matrix and the transformed membership matrix equals to 0. Simple calculation verifies $M = M^{(1)} S^{(1)}$. From another perspective, $\lambda^{(1)}$ is just a permutation of $\lambda$. Hence, in this situation the correspondence matrix $S^{(1)}$ is just a permutation matrix.

Similarly, (1) is solved with M and $M^{(2)}$ to obtain $S^{(2)}$. The $M^{(2)}$, the $S^{(2)}$ and the transformed membership matrix $M^{(2)} S^{(2)}$ are given in the equation below.

$$\begin{bmatrix} 1 & 0 \\ 1 & 0 \\ 1 & 0 \\ 1 & 0 \\ 0 & 1 \\ 0 & 1 \end{bmatrix} \times \begin{bmatrix} 0.5 & 0.5 & 0 \\ 0 & 0 & 1 \end{bmatrix} = \begin{bmatrix} 0.5 & 0.5 & 0 \\ 0.5 & 0.5 & 0 \\ 0.5 & 0.5 & 0 \\ 0.5 & 0.5 & 0 \\ 0 & 0 & 1 \\ 0 & 0 & 1 \end{bmatrix}$$

The correspondence matrix $S^{(2)}$ indicates that the cluster 1 in $\lambda^{(2)}$ corresponds to the cluster 1 and cluster 2 in $\lambda$ with the same weight and the cluster 2 in $\lambda^{(2)}$ corresponds to the cluster 3 in $\lambda$. This is exactly the relationship between $\lambda^{(2)}$ and $\lambda$. By the information from the transformed membership matrix $M^{(2)} S^{(2)}$ (the right-hand side of the above equation), the first fourth data points do not belong to cluster 3 and whether they belong to cluster 1 or cluster 2 cannot be determined, and the last two points belong to cluster 3. This is exactly the best information we can have by transforming $\lambda^{(2)}$ into the space of $\lambda$.

4. Derivation of The Algorithm

The problem of clustering ensemble can be described as follows: given a set of clusterings, $C = \{M^{(1)}, M^{(2)}, \ldots, M^{(r)}\}$, where $M^{(1)} \in \mathbb{R}^{n \times k_1}, M^{(2)} \in \mathbb{R}^{n \times k_2}, \ldots, M^{(r)} \in \mathbb{R}^{n \times k_r}$, and a number k, combine C into a final consensus clustering $M \in \mathbb{R}^{n \times k}$ using a consensus function.

Soft correspondence based on Euclidean distance provides a new consensus function for clustering ensemble. Hence, the problem of clustering ensemble is defined as an optimization problem below.

Definition 4.1. Given r membership matrices, $M^{(1)} \in \mathbb{R}^{n \times k_1}, \ldots, M^{(r)} \in \mathbb{R}^{n \times k_r}$, and $k \in \mathbb{Z}_+$, a consensus clustering represented by $M \in \mathbb{R}^{n \times k}$, and r correspondence matrices $S^{(1)} \in \mathbb{R}^{k_1 \times k}, \ldots, S^{(r)} \in \mathbb{R}^{k_r \times k}$ are given by the minimization of $$f(M, S^{(1)}, S^{(2)}, \ldots, S^{(r)}) = \sum_{h=1}^{r} \|M - M^{(h)} S^{(h)}\|^2 \quad (2)$$

subject to constraints $$\forall h, i, j : S_{ij}^{(h)} \geq 0 \text{ and } \sum_j S_{ij}^{(h)} = 1.$$

Although the consensus function in (2) is not convex in M and each $S^{(h)}$ simultaneously, it is convex in M and each $S^{(h)}$ respectively. Therefore, (2) can be minimized (local minimum) by alternatively optimizing one of them and fixing the others. An EM [1] style algorithm is derived that converges to a local minimum by iteratively updating the correspondence matrices and the consensus membership matrix using a set of multiplicative updating rules [4].

To derive simple multiplicative updating rules that converges to a good consensus clustering, two modifications are made to the consensus function (2).

First, the consensus clustering may converge to a clustering with an unreasonably small number of clusters. Note that although the consensus clustering $M \in \mathbb{R}^{n \times k}$, the number of clusters in it could be less than k. This provides the flexibility to explore the structure of the clustering by automatically adjusting the number of clusters under given k. However, it also provides the possibility that the number of clusters deteriorates to the trivial small number. A preferred embodiment of the invention therefore applies the column-sparseness constraint on the correspondence matrices to resolve this problem. A correspondence matrix of $M^{(h)}$ with respect to M is column-sparse implies that only a small number of clusters from $M^{(h)}$ significantly correspond to each cluster in M. Hence, the column-sparseness constraint forces the consen sus clustering M to provide clusters as many as possible under a given k. Since $$S_{ij}^{(h)} \geq 0 \text{ and } \sum_j S_{ij}^{(h)} = 1,$$

the sum of the variation of each column of $S^{(h)}$ is a measure of the column-sparseness of $S^{(h)}$, i.e., the greater the value of $\|S^{(h)}-(1/k_h)1_{k_h k_h}S^{(h)}\|^2$ is, the more column-sparse $S^{(h)}$ is. Therefore, to enforce the column-sparseness constraint, we add a new term, $$-\alpha \sum_{h=1}^{r} \|S^{(h)} - (1/k_h)1_{k_h k_h}S^{(h)}\|^2$$

to the consensus function (2), where $\alpha \geq 0$ is a constant and $1_{k_h k_h}$ is a $k_h$-by-$k_h$ matrix of 1s.

Second, it is difficult to deal with the external constraint $$\sum_j S_{ij}^{(h)} = 1$$

efficiently. Hence, it may be transformed to a "soft" constraint in accordance with another preferred embodiment of the invention, i.e., the constraint is implicitly enforced by adding a penalty term, $$\beta \sum_{h=1}^{r} \|S^{(h)}1_{kk} - 1_{k_h k}\|^2,$$

to the consensus function (2), where $\beta \geq 0$ is a constant.

Based on the above modifications, the problem of ensemble clustering is redefined as follows.

Definition 4.2. Given r membership matrices, $M^{(1)} \in \mathbb{R}^{n \times k_1}, \ldots, M^{(r)} \in \mathbb{R}^{n \times k_r}$, and $k \in \mathbb{Z}_+$, a consensus clustering represented by $M \in \mathbb{R}^{n \times k}$, and r correspondence matrices $S^{(1)} \in \mathbb{R}^{k_1 \times k}, \ldots, S^{(h)} \in \mathbb{R}^{k_h \times k}$ are given by the minimization of $$f(M, S^{(1)}, S^{(2)}, \ldots, S^{(r)}) = \tag{3}$$

$$\sum_{h=1}^{r} \|M - M^{(h)}S^{(h)}\|^2 - \alpha \left\|S^{(h)} - \frac{1}{k_h}1_{k_h k_h}S^{(h)}\right\|^2 + \beta\|S^{(h)}1_{kk} - 1_{k_h k}\|^2$$

Subject to the constraints of $\forall h, i, j : S_{ij}^{(h)} \geq 0$.

Taking the derivatives of f with respect to M and $S^{(h)}$, where $1 \leq h \leq r$, and after some algebraic manipulations, the gradients about M and $S^{(h)}$ are given as follows.

$$\frac{\partial f}{\partial M} = 2rM - 2\sum_{h=1}^{r} M^{(h)}S^{(h)} \tag{4}$$

$$\frac{\partial f}{\partial M} = -2(M^{(h)})^T M + 2(M^{(h)})^T M^{(h)}S^{(h)} - \tag{5}$$

$$2\alpha\left(S^{(h)} - \frac{1}{k_h}1_{k_h k_h}S^{(h)}\right) + 2\beta(S^{(h)}1_{kk} - 1_{k_h k})$$

Solving $\partial f/\partial M=0$, the update rule for M is given as $$M = \frac{1}{r}\sum_{h=1}^{r} M^{(h)}S^{(h)}. \tag{6}$$

On the other hand, directly solving $\partial f/\partial S^{(h)}=0$ does not give a feasible update rule for $S^{(h)}$, because the solution involves the computation of the inverse matrix that is usually expensive and unstable. Another choice is the gradient descent method, which gives the update rule as $$S^{(h)} \leftarrow S^{(h)} - \Theta \odot (\partial f/\partial S^{(h)}), \tag{7}$$

where $\odot$ denotes the Hadamard product of two matrices. $\Theta$ is a matrix of step size parameters. If each element of $\Theta$ is carefully chosen to be a small positive number, the update rule (7) will force the objective function (3) to be minimized at each iteration. However the choice of $\Theta$ can be very inconvenient for applications involving large data sets. Therefore, $\Theta$ may be set as follows to derive the multiplicative updating rules, $$\Theta = S^{(h)}/2D \tag{8}$$

where the division between two matrices is entrywise division (as generally employed herein) and $$D = (M^{(h)})^T M^{(h)} S^{(h)} - \alpha S^{(h)} + (\alpha/k_h)1_{k_h k_h}S^{(h)} + \beta k S^{(h)}1_{kk}. \tag{9}$$

Substituting (5), (8), and (9) into (7), the following multiplicative updating rule is obtained for each $S^{(h)}$.

$$S^{(h)} \leftarrow S^{(h)} \odot ((M^{(h)})^T M + \beta k 1_{k_h k})/D \tag{10}$$

Based on (6) and (10), the Soft Correspondence Ensemble Clustering (called SCEC) algorithm is listed in Algorithm 1. In Step 5 of Algorithm 1, D is computed based on (10) and $\epsilon$ is a very small positive number used to avoid dividing by 0.

---
Algorithm 1 SCEC($M^{(1)}, \ldots, M^{(k_r)}, k$)
---
1: Initialize $M, S^{(1)}, \ldots, S^{(r)}$.
2: while convergence criterion of M is not satisfied do
3:     for h = 1 to r do
4:         while convergence criterion of S(h) is not satisfied do
5:             $S^{(h)} \leftarrow S^{(h)} \odot ((M^{(h)})^T M + \beta k 1_{k_h k})/D + \epsilon)$
6:         end while
7:     end for
8:     $M = 1/r \sum_{h=1}^{r} M^{(h)}S^{(h)}$
9: end while
---

SCEC works as follows : First M is fixed, and each $S^{(h)}$ is updated to reduce the distance between $M^{(h)}S^{(h)}$ and M until $S^{(h)}$ converges; Second update M as the mean clustering of all of $M^{(h)}S^{(h)}$; Repeat above steps until M converges.

SCEC outputs a final consensus clustering as well as correspondence matrices that give intuitive interpretation of the relations between the consensus clustering and each clustering from clustering ensembles which may be desirable in many application scenarios. For example, in most distributed clustering scenarios, users from different sources not only want to get a final clustering solution but also care about the relationship between the clusterings they provide and the final clustering.

SCEC can readily deal with clustering problems with missing labels. Suppose that the label of the $i^{th}$ object in the $h^{th}$ clustering $M^{(h)}$ is missing. We simply let $M^{(h)}ij=1/k_h$ for $1 \leq j \leq k_h$, i.e., the $h_{th}$ clustering does not provide useful information to compute the final membership for the $i^{th}$ object, which is interpolated based on the information from other clusterings.

The computational complexity of SCEC can be shown as $\mathcal{O}(tnrk^2)$, where t is the number of iterations. It is much faster than CSPA ($\mathcal{O}(n^2rk)$) [15], since n is large. SCEC has the same complexity as that of two other efficient algorithms, QMI based on k-means [16] and the approach based on the mixture model [17]. In general, the computational complexity of k-means is $\mathcal{O}(tnmk)$ where m is the number of features. In [16], when applying k-means to the feature space induced by a clustering ensemble, the number of features is $$\sum_{h=1}^{r} k_h.$$

Since $k_h = \Theta(k)$, $m = \Theta(rk)$.

5. Proof of Correctness for SCEC

To prove SCEC is correct, we the consensus function (3) is proven to be non-increasing under update rules (6) and (10). It is obviously true for the update rule (6), since it is derived directly from $\partial f/\partial M = 0$. The multiplicative updating rule (10) can be viewed as a special type of gradient descent method. Since $\Theta$ in (8) is not small, it might appear that there is no guarantee that the consensus function is non-increasing under (10). It is proven that this is not the case herein below. Since the updating rules for all $S^{(h)}$ are the same, for convenience, the problem is simplified to the case of the ensemble with one clustering.

Theorem 5.1. Given two non-negative matrices $M \in \mathbb{R}^{n \times k}$ and $A \in \mathbb{R}^{n \times k_0}$, and the constraint $\forall i,j: S_{ij} \geq 0$ the objective function $$F(S) = \|M - AS\|^2 - \alpha \|S - (1/k_0) 1_{k_0 k_0} S\|^2 + \beta \|S 1_{kk} - 1_{k_0 k}\|^2 \quad (11)$$

is non-increasing under the update rule $$S^{t+1} \leftarrow S^t \odot \frac{A^T M + \beta k 1_{k_0 k}}{A^T A S^t - \alpha S^t + \frac{\alpha}{k_0} 1_{k_0 k_0} S^t + \beta k S^t 1_{kk}} \quad (12)$$

where t denotes the discrete time index.

To prove Theorem 5.1, the concept of the auxiliary function is used [1, 12]. $G(S, S')$ is an auxiliary function for $F(S)$ if $G(S, S') \geq F(S)$ and $G(S, S) = F(S)$. The auxiliary function is useful due to the following lemma.

Lemma 5.2. If G is an auxiliary function, then F is non-increasing under the updating rule $$S^{t+1} = \arg\min_{S} G(S, S^t).$$

The key of the proof is to define an appropriate auxiliary function. An auxiliary function is proposed for the objective function (11) in the following lemma.

Lemma 5.3. Let $U = (S \odot S)/S^t$. Then $$G(S, S^t) = tr(M^T M - 2 S^T A^T M + U^T A^T A S^t) - \quad (13)$$
$$tr\left(\alpha U^T S^t - \frac{\alpha}{k_0} U^T 1_{k_0 k_0} S^t\right) + tr(\beta 1_{kk} U^T S^t 1_{kk} - 2\beta 1_{kk_0} + \beta k 1_{kk})$$

is an auxiliary function for (11), where tr denotes the trace of a matrix.

Proof. The objective function (11) can be rewritten as:

$$F(S) = tr(M^T M - 2 S^T A^T M + S^T A^T A S) - \quad (14)$$
$$tr\left(\alpha S^T S - \frac{\alpha}{k_0} S^T 1_{k_0 k_0} S\right) + tr(\beta 1_{kk} S^T S 1_{kk} - 2\beta 1_{kk_0} S 1_{kk} + \beta k 1_{kk})$$

When $S = S^t$, $U = S$. Thus $G(S, S) = F(S)$. To show $G(S, S^t) \geq F(S)$, (13) is compared with (14) to find that it can be done by showing the following conditions.

$$tr(U^T A^T A S^t - S^T A^T A S) \geq 0 \quad (15)$$

$$tr(U^T S^t - S^T S) = 0 \quad (16)$$

$$tr\left(\frac{\alpha}{k_0} U^T 1_{k_0 k_0} S^t - \frac{\alpha}{k_0} S^T 1_{k_0 k_0} S\right) \geq 0 \quad (17)$$

$$tr(1_{kk} U^T S^t 1_{kk} - 1_{kk} S^T S 1_{kk}) \geq 0 \quad (18)$$

For convenience, let $Q = A^T A$; hence Q is a non-negative symmetric matrix. (15) is proven as follows.

$$\Delta = tr(U^T A^T A S^t - S^T A^T A S)$$
$$= \sum_{a,i,j} U_{ia} Q_{ij} S^t_{ja} - \sum_{a,i,j} S_{ia} Q_{ij} S_{ja}$$
$$= \sum_{a,i,j} Q_{ij} \left(\frac{S^2_{ia}}{S^t_{ia}} S^t_{ja} - S_{ia} S_{ja}\right)$$
$$= \sum_{a,i,<j} \left(Q_{ij} \left(\frac{S^2_{ia}}{S^t_{ia}} S^t_{ja} - S_{ia} S_{ja}\right) + Q_{ji} \left(\frac{S^2_{ja}}{S^t_{ja}} S^t_{ia} - S_{ja} S_{ia}\right)\right)$$
$$= \sum_{a,i,<j} \frac{Q_{ij}}{S^t_{ia} S^t_{ja}} (S_{ia} S^t_{ja} - S_{ja} S^t_{ia})^2$$
$$\geq 0$$

where $1 \leq a \leq k$ and $1 \leq i,j \leq k_0$. Similarly, (16), (17), and (18) can also be proven.

Finally, Theorem 5.1 can be proven.

Proof. The derivative of $G(S, S^t)$ with respect to S is $$\frac{\partial G}{\partial S} = \quad (19)$$
$$-2A^T M - 2\beta k 1_{k_0 k} + 2 \frac{S}{S^t} \odot \left(A^T A S^t - \alpha S^t + \frac{\alpha}{k_0} 1_{k_0 k_0} S^t + \beta k S^t 1_{kk}\right)$$

Solving $\partial G/\partial S = 0$, the updating rule (12) is obtained. By Lemma 5.2, F(S) is non-increasing under (12).

6. Empirical Evaluations

Experiments were conducted on three real world data sets to demonstrate the accuracy and robustness of SCEC in comparison with four other state-of-the-art algorithms for combining multiple clusterings.

6.1. Data sets and Parameter Settings

Three real-world data sets from the UCI machine learning repository are used. The characteristics of the data sets are summarized in Table 1. IRIS is a classical data set in the pattern recognition literature. PENDIG is for pen-based recognition of handwritten digits and there are ten classes of roughly equal size in the data corresponding to the digits 0 to 9. ISOLET6 is a subset of the ISOLET spoken letter recognition training set and it contains the instances of six classes randomly selected out of twenty six classes.

SCEC is compared with four other state-of-the-art representative algorithms. Two of them are graph partitioning based algorithms, CSPA and MCLA [15]. The code for them is available at http://www.strehl.com. The third algorithm is QMI that is based on k-means [16]. The last one is based on the mixture model [17] and we call it Mixture Model based Ensemble Clustering (MMEC).

The Cluster-based Similarity Partitioning Algorithm (CSPA) works as follows: Essentially, if two objects are in the same cluster then they are considered to be fully similar, and if not they are dissimilar. This is the simplest heuristic and is used in the Cluster-based Similarity Partitioning Algorithm (CSPA). With this viewpoint, one can simply reverse engineer a single clustering into a binary similarity matrix. Similarity between two objects is 1 if they are in the same cluster and 0 otherwise. For each clustering, a n×n binary similarity matrix is created. The entry-wise average of r such matrices representing the r sets of groupings yields an overall similarity matrix.

Alternatively, and more concisely, this can be interpreted as using k binary cluster membership features and defining similarity as the fraction of clusterings in which two objects are in the same cluster. The entire n×n similarity matrix S can be computed in one sparse matrix multiplication S=(1/r)HH†. Now, the similarity matrix may be used to recluster the objects using any reasonable similarity based clustering algorithm. The induced similarity graph may be partitioned (vertex=object, edge weight=similarity) using METIS because of its robust and scalable properties.

The Meta-CLustering Algorithm (MCLA) operates as follows: The Meta-CLustering Algorithm (MCLA) is based on clustering clusters. It also yields object-wise confidence estimates of cluster membership. Each cluster may be represented by a hyperedge. The idea in MCLA is to group and collapse related hyperedges and assign each object to the collapsed hyperedge in which it participates most strongly. The hyperedges that are considered related for the purpose of collapsing are determined by a graph-based clustering of hyperedges. We refer to each cluster of hyperedges as a meta-cluster $C^{(M)}$. Collapsing reduces the number of hyperedges from $$\sum_{q=1}^{r} k^{(q)}$$

to k. The detailed steps are:

(a) Construct Meta-graph. Let us view all the $\Sigma rq=1k(q)$ indicator vectors h (the hyperedges of H) as vertices of another regular undirected graph, the meta-graph. The edge weights are proportional to the similarity between vertices. A suitable similarity measure here is the binary Jaccard measure, since it is the ratio of the intersection to the union of the sets of objects corresponding to the two hyperedges. Formally, the edge weight $w_{a,b}$ between two vertices $h_a$ and $h_b$ as defined by the binary Jaccard measure of the corresponding indicator vectors $h_a$ and $h_b$ is:

$$w_{a,b} = \frac{h_a^\dagger h_b}{\|h_a\|_2^2 + \|h_b\|_2^2 - h_a^\dagger h_b}.$$

Since the clusters are non-overlapping (e.g., hard), there are no edges amongst vertices of the same clustering $H^{(q)}$ and, thus, the meta-graph is r-partite.

(b) Cluster Hyperedges. Find matching labels by partitioning the meta-graph into k balanced meta-clusters. Each vertex is weighted proportional to the size of the corresponding cluster. Balancing ensures that the sum of vertex-weights is approximately the same in each meta-cluster. The graph partitioning package METIS may be used in this step. This results in a clustering of the h vectors. Since each vertex in the meta-graph represents a distinct cluster label, a meta-cluster represents a group of corresponding labels.

(c) Collapse Meta-clusters. For each of the k meta-clusters, the hyperedges are collapsed into a single meta-hyperedge. Each meta-hyperedge has an association vector which contains an entry for each object describing its level of association with the corresponding meta-cluster. The level is computed by averaging all indicator vectors h of a particular meta-cluster. An entry of 0 or 1 indicates the weakest or strongest association, respectively.

(d) Compete for Objects. In this step, each object is assigned to its most associated meta-cluster: Specifically, an object is assigned to the meta-cluster with the highest entry in the association vector. Ties are broken randomly. The confidence of an assignment is reflected by the winner's share of association (ratio of the winner's association to the sum of all other associations). Note that not every meta-cluster can be guaranteed to win at least one object. Thus, there are at most k labels in the final combined clustering λ.

The quadratic mutual information algorithm is described in more detail in D. Xu and J. Principe, "Learning from examples with quadratic mutual information", Neural Networks for Signal Processing—Proceedings of the IEEE Workshop 1998. IEEE, Piscataway, N.J., USA. p 155-164 (1998), citeseer.ist.psu.edu/xu98learning.html.

The k-means algorithm is used to generate the clustering ensembles in three ways. For each data set, three types of clustering ensembles are generated as follows. The first is generated with Random Initiation (RI) of k-means and the number of clusters for each clustering in the ensemble is set to be the number of clusters in the consensus (target) clustering. The second is generated such that the number of clusters for each clustering in the ensemble is a Random Number (RN) between 2 and 2c, where c is the true number of classes. The third is generated to simulate distributed clustering scenarios such that each clustering of an ensemble is based on a data set in a Random Subspace (RS) of the original full feature space. The dimension of the subspace for each data set is set to about a half of the dimension of the full feature space, i.e., 2, 8, and 308 are for IRIS, PENDIG and ISOLET6, respectively.

TABLE 1

Summary of the data sets

| Dataset | No. of Instances | No. of features | No. of classes | No. of clusters |
|---------|------------------|-----------------|----------------|-----------------|
| IRIS | 150 | 4 | 3 | (2, 3, 4) |
| PENDIG | 3498 | 16 | 10 | (5, 10, 15, 20) |
| ISOLET6 | 1440 | 617 | 6 | (3, 6, 9, 12) |

For the number of clusters in the consensus (target) clustering k, it is not fixed on the true number of the classes. Since in real applications, usually the true number of classes is not known, it is desirable to test the robustness of an algorithm to different number of clusters. The last column of Table 1 reports the numbers of clusters used for each data set. For the number of combined clusterings r, we adopt r=5, 20, 50 for each data set. For the initialization of SCEC algorithm, the consensus clustering M is set as a clustering randomly chosen from the ensemble and each correspondence matrix is initialized with a randomly generated correspondence matrix.

For the evaluation criterion, we select to use an information theoretic criterion—the Normalized Mutual Information (NMI) criterion [15]. Treating cluster labels and class labels as random variables, NMI measures the mutual information shared by the two random variables and is normalized to a [0, 1] range.

6.2. Results and Discussion

The results for each data set are presented in Table 2-10. The tables report the mean NMI from 20 independent runs of each combination of r and k. Except for the five algorithms, the mean NMIs for the Base Learner (BL), the k-means, are also reported in the tables.

Comparing the base learner, none of the five algorithms leads to the performance improvement over the base learner in all cases. SCEC gives performance improvement over the base learner under 77 out of 99 situations. This is the best result among the five algorithms. An interesting observation is that the most situations when the algorithms fail to improve performance are the situations where the number of clusters is set to be less than the true number of the classes. The possible reason is that under this situation the base learner tend to give more data points random assignments, which make the ensemble provide less useful information.

Comparing the five algorithms with each other, none of the algorithms is the absolute winner that has the best mean NMI in every situation. Each algorithm may achieve better performance under some specific conditions. For example, MCLA tends to give good performance under the true number of the classes because that provides nearly-balanced clusters. MMEC works better on a large size data set because reliability of model parameter estimation is improved in this situation. SCEC is observed to be the most robust algorithm and it outperforms the other algorithms in most situations.

However, to evaluate the overall performance strictly, direct observation of the data is not sufficient and we need to do statistical test on the result. The paired t-test was performed on the 99 pairs of NMIs from all the tables for each pair of the algorithms. The p-value for each test is reported in Table 11. The (i, j) entry of Table 11 presents the p-value for the following one-sided paired t-test: $H_0$: the mean of the mean NMI for algorithm i equals to the mean of the mean NMI for algorithm j vs H: the mean of the mean NMI for algorithm i is greater than the mean of the mean NMI for algorithm j, i.e., if p-value in (i, j) entry is less than 0.05, H is accepted with confidence level 0.95, which means that a conclusion can be drawn that algorithm i outperforms algorithm j significantly.

By Table 11, SCEC performs significantly better than all other algorithms. The performance of CSPA is significantly worse than all others. The possible reason is that CSPA needs a large number of clusterings to provide a reliable estimate of the co-association values. However ensembles of a very large size are less important in practice. MCLA is significantly better than MMEC and there is no significant difference between MCLA and QMI. Also there is no significant difference between QMI and MMEC. When comparing the base learner, SCEC is the only one that leads to a significant performance improvement over the base learner.

TABLE 2

IRIS dataset with RI

| r | k | SCEC | CSPA | MCLA | QMI | MMEC | BL |
|---|---|------|------|------|-----|------|-----|
| 5 | 2 | 0.6793 | 0.4164 | 0.6793 | 0.6793 | 0.6793 | 0.6793 |
| 5 | 3 | 0.7463 | 0.6978 | 0.7517 | 0.6567 | 0.7288 | 0.7069 |
| 5 | 4 | 0.7266 | 0.5610 | 0.7050 | 0.6356 | 0.7052 | 0.7008 |
| 20 | 2 | 0.6793 | 0.4164 | 0.6793 | 0.6793 | 0.6793 | 0.6793 |
| 20 | 3 | 0.7528 | 0.6921 | 0.7476 | 0.6764 | 0.7257 | 0.7201 |
| 20 | 4 | 0.7274 | 0.5826 | 0.7171 | 0.6603 | 0.6385 | 0.6999 |
| 50 | 2 | 0.6793 | 0.4164 | 0.6793 | 0.6793 | 0.6793 | 0.6793 |
| 50 | 3 | 0.7528 | 0.6916 | 0.7428 | 0.6731 | 0.6962 | 0.7166 |
| 50 | 4 | 0.7515 | 0.5879 | 0.7177 | 0.6119 | 0.6351 | 0.7003 |
| Avg. | | 0.7217 | 0.5625 | 0.7133 | 0.6981 | 0.6613 | 0.6853 |

TABLE 3

IRIS dataset with RN

| r | k | SCEC | CSPA | MCLA | QMI | MMEC | BL |
|---|---|------|------|------|-----|------|-----|
| 5 | 2 | 0.6914 | 0.4941 | 0.5724 | 0.6385 | 0.5958 | 0.6738 |
| 5 | 3 | 0.7545 | 0.8102 | 0.7891 | 0.6464 | 0.7067 | 0.6826 |
| 5 | 4 | 0.7367 | 0.5709 | 0.7111 | 0.6883 | 0.6691 | 0.6900 |
| 20 | 2 | 0.753 | 0.5012 | 0.5174 | 0.644 | 0.4964 | 0.6761 |
| 20 | 3 | 0.7706 | 0.8383 | 0.8166 | 0.6758 | 0.5775 | 0.6773 |
| 20 | 4 | 0.7305 | 0.5898 | 0.6823 | 0.6712 | 0.619 | 0.6811 |
| 50 | 2 | 0.7612 | 0.5076 | 0.4963 | 0.6863 | 0.4365 | 0.6774 |
| 50 | 3 | 0.7804 | 0.8411 | 0.8539 | 0.6183 | 0.5284 | 0.6777 |
| 50 | 4 | 0.7391 | 0.5868 | 0.6857 | 0.6583 | 0.5251 | 0.6773 |
| Avg. | | 0.7464 | 0.6378 | 0.6805 | 0.6586 | 0.5727 | 0.6793 |

TABLE 4

IRIS dataset with RS

| r | k | SCEC | CSPA | MCLA | QMI | MMEC | BL |
|---|---|------|------|------|-----|------|-----|
| 5 | 2 | 0.6560 | 0.4380 | 0.6497 | 0.5960 | 0.6756 | 0.5825 |
| 5 | 3 | 0.7626 | 0.7748 | 0.7686 | 0.7018 | 0.7665 | 0.6856 |
| 5 | 4 | 0.6851 | 0.5556 | 0.6685 | 0.6822 | 0.6921 | 0.6294 |
| 20 | 2 | 0.6831 | 0.4635 | 0.6758 | 0.6895 | 0.6437 | 0.5932 |
| 20 | 3 | 0.7658 | 0.7735 | 0.7664 | 0.7185 | 0.7494 | 0.6828 |
| 20 | 4 | 0.7425 | 0.5870 | 0.7098 | 0.7006 | 0.6976 | 0.6336 |
| 50 | 2 | 0.7059 | 0.4596 | 0.6858 | 0.7186 | 0.6184 | 0.5991 |
| 50 | 3 | 0.7532 | 0.7775 | 0.7496 | 0.7248 | 0.7062 | 0.6746 |
| 50 | 4 | 0.7418 | 0.5841 | 0.7106 | 0.7173 | 0.6861 | 0.6358 |
| Avg. | | 0.7218 | 0.6015 | 0.7094 | 0.6944 | 0.6928 | 0.6352 |

TABLE 5

PENDIG dataset with RI

| r | k | SCEC | CSPA | MCLA | QMI | MMEC | BL |
|---|---|------|------|------|-----|------|-----|
| 5 | 5 | 0.5585 | 0.4855 | 0.5639 | 0.5228 | 0.5517 | 0.5607 |
| 5 | 10 | 0.6734 | 0.6245 | 0.6734 | 0.6434 | 0.6564 | 0.6808 |
| 5 | 15 | 0.731 | 0.6458 | 0.7202 | 0.688 | 0.7143 | 0.7253 |
| 5 | 20 | 0.743 | 0.6813 | 0.7289 | 0.6931 | 0.7183 | 0.7355 |
| 20 | 5 | 0.5593 | 0.4942 | 0.5673 | 0.5328 | 0.5336 | 0.5601 |
| 20 | 10 | 0.6756 | 0.6394 | 0.6823 | 0.6499 | 0.643 | 0.6818 |
| 20 | 15 | 0.732 | 0.661 | 0.7213 | 0.687 | 0.6911 | 0.7247 |
| 20 | 20 | 0.7484 | 0.6941 | 0.7388 | 0.7091 | 0.701 | 0.7361 |
| 50 | 5 | 0.5691 | 0.506 | 0.5686 | 0.5353 | 0.533 | 0.5608 |
| 50 | 10 | 0.6778 | 0.6463 | 0.6817 | 0.6468 | 0.6415 | 0.6815 |
| 50 | 15 | 0.733 | 0.6588 | 0.722 | 0.6897 | 0.6849 | 0.7236 |
| 50 | 20 | 0.7526 | 0.6932 | 0.7356 | 0.7175 | 0.6852 | 0.7357 |
| Avg. | | 0.6795 | 0.6192 | 0.6753 | 0.643 | 0.6462 | 0.6755 |

TABLE 6

PENDIG dataset with RN

| r | k | SCEC | CSPA | MCLA | QMI | MMEC | BL |
|---|---|------|------|------|-----|------|-----|
| 5 | 5 | 0.5709 | 0.5282 | 0.5413 | 0.5164 | 0.5584 | 0.6247 |
| 5 | 10 | 0.6915 | 0.6383 | 0.6285 | 0.6281 | 0.6746 | 0.6702 |
| 5 | 15 | 0.718 | 0.6344 | 0.6305 | 0.6921 | 0.7097 | 0.666 |
| 5 | 20 | 0.7118 | 0.6399 | 0.6463 | 0.6969 | 0.7137 | 0.6669 |
| 20 | 5 | 0.5738 | 0.5445 | 0.5781 | 0.5394 | 0.54 | 0.6422 |
| 20 | 10 | 0.6901 | 0.6417 | 0.6828 | 0.6627 | 0.6518 | 0.6515 |
| 20 | 15 | 0.7108 | 0.6494 | 0.6441 | 0.6936 | 0.7021 | 0.627 |
| 20 | 20 | 0.7256 | 0.6523 | 0.6277 | 0.6986 | 0.7153 | 0.6535 |
| 50 | 5 | 0.5833 | 0.5489 | 0.5841 | 0.5483 | 0.5227 | 0.6474 |
| 50 | 10 | 0.6935 | 0.6493 | 0.6907 | 0.6581 | 0.6534 | 0.6485 |
| 50 | 15 | 0.7179 | 0.6536 | 0.7035 | 0.6876 | 0.6805 | 0.6477 |
| 50 | 20 | 0.712 | 0.6557 | 0.6741 | 0.6964 | 0.707 | 0.6433 |
| Avg. | | 0.6749 | 0.6197 | 0.636 | 0.6432 | 0.6524 | 0.6491 |

TABLE 7

PENDIG dataset with RS

| r | k | SCEC | CSPA | MCLA | QMI | MMEC | BL |
|---|---|------|------|------|-----|------|-----|
| 5 | 5 | 0.5033 | 0.4790 | 0.4944 | 0.4962 | 0.5311 | 0.4896 |
| 5 | 10 | 0.6546 | 0.6247 | 0.6496 | 0.6451 | 0.6841 | 0.6092 |
| 5 | 15 | 0.6944 | 0.6290 | 0.6657 | 0.6620 | 0.7085 | 0.6422 |
| 5 | 20 | 0.7017 | 0.6592 | 0.6689 | 0.6934 | 0.7200 | 0.6483 |
| 20 | 5 | 0.5383 | 0.5101 | 0.5464 | 0.5598 | 0.5626 | 0.4952 |
| 20 | 10 | 0.6586 | 0.6468 | 0.6790 | 0.6850 | 0.6862 | 0.6143 |
| 20 | 15 | 0.7129 | 0.6560 | 0.7022 | 0.7197 | 0.7302 | 0.6401 |
| 20 | 20 | 0.7281 | 0.6991 | 0.7124 | 0.7190 | 0.7218 | 0.6539 |
| 50 | 5 | 0.5428 | 0.5189 | 0.5458 | 0.5665 | 0.5778 | 0.4950 |
| 50 | 10 | 0.6596 | 0.6548 | 0.6790 | 0.6869 | 0.6841 | 0.6047 |
| 50 | 15 | 0.7238 | 0.6653 | 0.7009 | 0.7326 | 0.7105 | 0.6431 |
| 50 | 20 | 0.7322 | 0.6925 | 0.7167 | 0.7371 | 0.6988 | 0.6540 |
| Avg. | | 0.6542 | 0.6196 | 0.6468 | 0.6586 | 0.6680 | 0.5991 |

TABLE 8

ISOLET6 dataset with RI

| r | k | SCEC | CSPA | MCLA | QMI | MMEC | BL |
|---|---|------|------|------|-----|------|-----|
| 5 | 3 | 0.6661 | 0.5366 | 0.7039 | 0.5981 | 0.645 | 0.6686 |
| 5 | 6 | 0.7147 | 0.7021 | 0.7284 | 0.5909 | 0.6829 | 0.6631 |
| 5 | 9 | 0.6761 | 0.5521 | 0.6374 | 0.6415 | 0.6338 | 0.6502 |
| 5 | 12 | 0.6644 | 0.6296 | 0.6356 | 0.6126 | 0.6286 | 0.6374 |
| 20 | 3 | 0.5978 | 0.5471 | 0.596 | 0.6144 | 0.5974 | 0.6271 |
| 20 | 6 | 0.6955 | 0.7006 | 0.698 | 0.6432 | 0.6747 | 0.6655 |
| 20 | 9 | 0.6875 | 0.546 | 0.6452 | 0.638 | 0.6332 | 0.6503 |
| 20 | 12 | 0.683 | 0.6406 | 0.639 | 0.6438 | 0.6311 | 0.6375 |
| 50 | 3 | 0.6052 | 0.5468 | 0.6808 | 0.6345 | 0.6059 | 0.6385 |
| 50 | 6 | 0.7048 | 0.7006 | 0.698 | 0.6123 | 0.6318 | 0.6608 |
| 50 | 9 | 0.6901 | 0.5541 | 0.644 | 0.6456 | 0.6331 | 0.6512 |
| 50 | 12 | 0.6716 | 0.6416 | 0.6432 | 0.6471 | 0.611 | 0.6341 |
| Avg. | | 0.6714 | 0.6082 | 0.6625 | 0.6268 | 0.634 | 0.6487 |

TABLE 9

ISOLET6 dataset with RN

| r | k | SCEC | CSPA | MCLA | QMI | MMEC | BL |
|---|---|------|------|------|-----|------|-----|
| 5 | 3 | 0.6705 | 0.6169 | 0.6463 | 0.554 | 0.5203 | 0.7072 |
| 5 | 6 | 0.7393 | 0.7487 | 0.665 | 0.6773 | 0.7019 | 0.7057 |
| 5 | 9 | 0.7686 | 0.6225 | 0.6139 | 0.7201 | 0.764 | 0.7189 |
| 5 | 12 | 0.7543 | 0.7269 | 0.5909 | 0.7397 | 0.7447 | 0.7062 |
| 20 | 3 | 0.6753 | 0.5708 | 0.545 | 0.5949 | 0.5498 | 0.6988 |
| 20 | 6 | 0.7292 | 0.8241 | 0.6891 | 0.696 | 0.7038 | 0.6963 |
| 20 | 9 | 0.7629 | 0.6196 | 0.6525 | 0.7215 | 0.7173 | 0.6948 |
| 20 | 12 | 0.779 | 0.7434 | 0.5197 | 0.7448 | 0.752 | 0.6957 |
| 50 | 3 | 0.6769 | 0.5874 | 0.602 | 0.5928 | 0.5404 | 0.7075 |

TABLE 9-continued

ISOLET6 dataset with RN

| r | k | SCEC | CSPA | MCLA | QMI | MMEC | BL |
|---|---|------|------|------|-----|------|-----|
| 50 | 6 | 0.7627 | 0.8239 | 0.798 | 0.7346 | 0.7044 | 0.7085 |
| 50 | 9 | 0.7802 | 0.6041 | 0.7468 | 0.7525 | 0.7138 | 0.7044 |
| 50 | 12 | 0.7831 | 0.7454 | 0.6634 | 0.7328 | 0.7296 | 0.7037 |
| Avg. | | 0.7402 | 0.6862 | 0.6444 | 0.6884 | 0.6785 | 0.704 |

TABLE 10

ISOLET6 dataset with RS

| r | k | SCEC | CSPA | MCLA | QMI | MMEC | BL |
|---|---|------|------|------|-----|------|-----|
| 5 | 3 | 0.6469 | 0.5286 | 0.6424 | 0.6706 | 0.6622 | 0.6512 |
| 5 | 6 | 0.7175 | 0.7532 | 0.7349 | 0.6865 | 0.7198 | 0.7218 |
| 5 | 9 | 0.7352 | 0.6188 | 0.7298 | 0.7100 | 0.7346 | 0.7133 |
| 5 | 12 | 0.7415 | 0.7210 | 0.7168 | 0.7010 | 0.7272 | 0.7024 |
| 20 | 3 | 0.6644 | 0.5838 | 0.6305 | 0.6788 | 0.6623 | 0.6518 |
| 20 | 6 | 0.7075 | 0.7554 | 0.7119 | 0.7101 | 0.7090 | 0.7080 |
| 20 | 9 | 0.7757 | 0.6228 | 0.7440 | 0.7513 | 0.7496 | 0.7169 |
| 20 | 12 | 0.7338 | 0.7502 | 0.7463 | 0.7324 | 0.7236 | 0.7057 |
| 50 | 3 | 0.6270 | 0.6004 | 0.6535 | 0.6640 | 0.6411 | 0.6522 |
| 50 | 6 | 0.7218 | 0.7907 | 0.7297 | 0.7106 | 0.7050 | 0.7239 |
| 50 | 9 | 0.7791 | 0.6218 | 0.7328 | 0.7390 | 0.7380 | 0.7204 |
| 50 | 12 | 0.7568 | 0.7523 | 0.7477 | 0.7518 | 0.7287 | 0.7067 |
| Avg. | | 0.7173 | 0.6749 | 0.7100 | 0.7088 | 0.7084 | 0.6979 |

TABLE 11

P-values of paired t-tests

| | SCEC | CSPA | MCLA | QMI | MMEC | BL |
|---|------|------|------|-----|------|-----|
| SCEC | NA | 0.000 | 0.000 | 0.000 | 0.000 | 0.000 |
| CSPA | 1.000 | NA | 1.000 | 1.000 | 1.000 | 1.000 |
| MCLA | 1.000 | 0.000 | NA | 0.084 | 0.034 | 0.088 |
| QMI | 1.000 | 0.000 | 0.916 | NA | 0.229 | 0.538 |
| MMEC | 1.000 | 0.000 | 0.966 | 0.771 | NA | 0.727 |
| BL | 1.000 | 0.000 | 0.912 | 0.462 | 0.273 | NA |

7. Conclusions

The present invention provides a new soft correspondence framework for combining multiple clusterings. Under this framework, a correspondence matrix is defined as an optimal solution to a given distance function and it results in a new consensus function. Based on the consensus function, a novel algorithm SCEC is proposed that iteratively computes the consensus clustering and the correspondence matrices using the multiplicative updating rules. The correctness of the SCEC algorithm is shown theoretically. Extensive empirical evaluations are provided which demonstrate the superior effectiveness of SCEC to several well-known algorithms in the literature on combining multiple clusterings.

From the foregoing, it should be clear that the present invention may be embodied in forms other than those described above. The scope of the present invention should thus be determined by the claims ultimately allowed and is not limited by the foregoing detailed discussion of the preferred embodiments.

REFERENCES

[1] N. M. L. A. P. Dempster and D. B. Rubin. Maximum likelihood from incomplete data via the EM algorithm. *Journal of the Royal Statistical Society*, 39(8):1-38, 1977.

[2] A. K. Jain and R. C. Dubes. *Algorithms for Clustering Data*. Prentice-Hall, Englewood Cliffs, N.J., 1988.

[3] M. H. C. L. Alexander P. Topchy and A. K. Jain. Analysis of consensus partition in cluster ensemble. In *ICDM'04*, pages 1101-1111. 2004.

[4] D. D. Lee and H. S. Seung. Learning the parts of objects by non-negative matrix factorization. *Nature,* 401:788-791, 1999.
[5] E. Dimitriadou, A. Weingessel, and K. Hornik. Voting-merging: An ensemble method for clustering. In *ICANN '01*.
[6] X. Z. Fern and C. E. Brodley. Solving cluster ensemble problems by bipartite graph partitioning. In *ICML '04*.
[7] B. Fischer and J. M. Buhmann. Path-based clustering for grouping of smooth curves and texture segmentation. *IEEE Trans. Pattern Anal. Mach. Intell.,* 25(4):513-518, 2003.
[8] A. L. Fred and A. K. Jain. Data clustering using evidence accumulation. In *ICPR '02*.
[9] A. L. N. Fred. Finding consistent clusters in data partitions. In *Multiple Classifier Systems*, pages 309-318, 2001.
[10] G. Karypis, R. Aggarwal, V. Kumar, and S. Shekhar. Multilevel hypergraph partitioning: application in vlsi domain. In *DAC '97*.
[11] G. Karypis and V. Kumar. A fast and high quality multilevel scheme for partitioning irregular graphs. *SIAM J. Sci. Comput.,* 20(1):359-392, 1998.
[12] D. D. Lee and H. S. Seung. Algorithms for non-negative matrix factorization. In *NIPS*, pages 556-562, 2000.
[13] N. C. S. P. Kellam, X. Lin and A. Tucker. Comparing, contrasting and combining clusters in viral gene expression data. In *Proceedings of 6th Workshop on Intelligence Data Analysis in Medicine an Pharmocology*, pages 56-62, 2001.
[14] S. Dudoit and J. Fridlyand. Bagging to improve the accuracy of a clustering procedure. *Bioinformatics,* 19(9): 1090-1099, 2003.
[15] A. Strehl and J. Ghosh. Cluster ensembles—a knowledge reuse framework for combining partitionings. In *AAAI* 2002. AAAI/MIT Press.
[16] A. Topchy, A. K. Jain, and W. Punch. Combining multiple weak clusterings. In *Proceedings of the Third IEEE International Conference on Data Mining*, page 331, 2003.
[17] A. Topchy, A. K. Jain, and W. Punch. A mixture model for clustering ensembles. In *proc. AIAM Data mining*, page 379, 2004.

The invention claimed is:

1. A method of determining a consensus clustering and correspondence matrices from a plurality of membership matrices, comprising:
iteratively computing, with an automated processor, from r membership matrices $M^{(1)} \in \mathbb{R}^{n \times k_1}, \ldots, M^{(r)} \in \mathbb{R}^{n \times k_r}$, $k \in \mathbb{Z}^+$, the consensus clustering represented by $M \in \mathbb{R}^{n \times k}$ and the r correspondence matrices $S^{(1)} \in \mathbb{R}^{k_1 \times k}, \ldots, S^{(h)} \in \mathbb{R}^{k_h \times k}$,
by minimization of an objective function comprising a consensus function f,
updating $S^{(h)}$ using update rule:

$$S^{(h)} \leftarrow S^{(h)} - \Theta \odot \left( \frac{\partial f}{\partial S^{(h)}} \right)$$

until predetermined convergence conditions are achieved, wherein $\odot$ denotes the Hadamard product of two matrices, $\Theta$ is a matrix of step size parameters, and
updating M using update rule:

$$M \leftarrow M = \frac{1}{r} \sum_{h=1}^{r} M^{(h)} S^{(h)}$$

until predetermined convergence conditions are achieved; and
storing the computed consensus clustering and the correspondence matrices in a memory.

2. The method according to claim 1, wherein the objective function comprises a Euclidean distance.

3. The method according to claim 1, wherein the objective function comprises a term added to a consensus function in order to enforce a matrix sparseness constraint.

4. The method according to claim 1, wherein the objective function comprises a penalty term added to a consensus function in order to enforce an external $$\sum_j S_{ij}^{(h)} = 1$$

constraint.

5. The method according to claim 1, wherein the objective function comprises a consensus function term, a matrix sparseness constraint enforcement term, and a penalty term in order to enforce an external $$\sum_j S_{ij}^{(h)} = 1$$

constraint.

6. The method according to claim 1, wherein $$\Theta = \frac{S^{(h)}}{2D}, \text{ and}$$

$$D = (M^{(h)})^T M^{(h)} S^{(h)} - \alpha S^{(h)} + \frac{\alpha}{k_h} 1_{k_h k_h} S^{(h)} + \beta k S^{(h)} 1_{kk},$$

such that the updating rule for $S^{(h)}$ is:

$$S^{(h)} \leftarrow S^{(h)} \odot \frac{(M^{(h)})^T M + \beta k 1_{k_h k}}{D + \varepsilon},$$

where:
α is a constant ≧0, selected to enforce a column-sparseness constraint, and
β is a scaling constant ≧0, for scaling a penalty term added to a consensus function $f(M, S^{(1)}, S^{(2)}, \ldots, S^{(r)})$ to deal with an external constraint $$\sum_j S_{ij}^{(h)} = 1$$

efficiently,
k denotes the number of clusters,
$1_{k_h k_h}$ denotes a $k_h$-by-$k_h$ matrix of 1s, and
ε is a very small positive number used to avoid dividing by 0.

7. The method according to claim 1, wherein $$S = \underset{Y}{\operatorname{argmin}} \|M - M^{(0)} Y\|^2, \text{ where } \|\cdot\|$$

denotes Frobenius matrix norm, and the objective function comprises a function of:
the consensus function f,
a term $$\alpha \sum_{h=1}^{r} \|S^{(h)} - (1/k_h)1_{k_h k_h} S^{(h)}\|^2$$

to enforce the column sparseness constraint, and
a penalty term $$\beta \sum_{h=1}^{r} \|S^{(h)} 1_{kk} - 1_{khk}\|^2$$

added to the consensus function to implement a constraint $$\sum_{j} S_{ij}^{(h)} = 1,$$

where $\alpha$ and $\beta$ are constants $\geq 0$, k denotes the number of clusters, and $1_{khkh}$ denotes a $k_h$-by-$k_h$ matrix of 1s.

8. The method according to claim 1, wherein the membership matrices comprise clusterings of content anchor text, uniform resource locators (URLs), and hyperlinks of hyperlinked documents.

9. A non-transitory computer readable medium for controlling an automated system to iteratively compute from r membership matrices $M^{(1)} \in \mathbb{R}^{n \times k1}, \ldots, M^{(r)} \in \mathbb{R}^{n \times kr}$, and $k \in \mathbb{Z}^+$, the consensus clustering represented by $M \in \mathbb{R}^{n \times k}$ and the r correspondence matrices $S^{(1)} \in \mathbb{R}^{k1 \times k}, \ldots, S^{(h)} \in \mathbb{R}^{kh \times k}$,
by minimization of an objective function comprising a consensus function f,
updating $S^{(h)}$ using update rule:

$$S^{(h)} \leftarrow S^{(h)} - \Theta \odot \left(\frac{\partial f}{\partial S^{(h)}}\right)$$

until predetermined convergence conditions are achieved, wherein $\odot$ denotes the Hadamard product of two matrices, $\Theta$ is a matrix of step size parameters, and
updating M using update rule:

$$M \leftarrow M = \frac{1}{r} \sum_{h=1}^{r} M^{(h)} S^{(h)}$$

until predetermined convergence conditions are achieved; and
storing the computed consensus clustering and the correspondence matrices in a memory.

10. The non-transitory computer readable medium according to claim 9, wherein the objective function comprises a Euclidean distance, and the objective function comprises a consensus function term, a matrix sparseness constraint enforcement term, and a penalty term in order to enforce an external $$\sum_{j} S_{ij}^{(h)} = 1$$

constraint.

11. The non-transitory computer readable medium according to claim 10, wherein $$\Theta = \frac{S^{(h)}}{2D}, \text{ and}$$

$$D = (M^{(h)})^T M^{(h)} S^{(h)} - \alpha S^{(h)} + \frac{\alpha}{k_h} 1_{k_h k_h} S^{(h)} + \beta k S^{(h)} 1_{kk},$$

such that the updating rule for $S^{(h)}$ is:

$$S^{(h)} \leftarrow S^{(h)} \odot \frac{(M^{(h)})^T M + \beta k 1_{k_h k}}{D + \varepsilon},$$

where:
$\alpha$ is a constant $\geq 0$, selected to enforce a column-sparseness constraint, and
$\beta$ is a scaling constant $\geq 0$, for scaling a penalty term added to a consensus function $f(M, S^{(1)}, S^{(2)}, \ldots, S^{(r)})$ to deal with an external constraint $$\sum_{j} S_{ij}^{(h)} = 1$$

efficiently,
k denotes the number of clusters,
$1_{khkh}$ denotes a $k_h$-by-$k_h$ matrix of 1s, and
$\varepsilon$ is a very small positive number used to avoid dividing by 0.

12. The non-transitory computer readable medium according to claim 9, wherein $$S = \underset{Y}{\operatorname{argmin}} \|M - M^{(0)} Y\|^2,$$

where $\|\cdot\|$ denotes Frobenius matrix norm, and the objective function comprises:
the consensus function f;
a term $$\alpha \sum_{h=1}^{r} \|S^{(h)} - (1/k_h) 1_{khkh} S^{(h)}\|^2$$

added to the consensus function to enforce a column sparseness constraint; and
a penalty term $$\beta \sum_{h=1}^{r} \|S^{(h)} 1_{kk} - 1_{khk}\|^2$$

added to the consensus function to meet external constraint $$\sum_{j} S_{ij}^{(h)} = 1,$$

where $\alpha$ and $\beta$ are constants $\geq 0$, k denotes the number of clusters, and $1_{khkh}$ denotes a $k_h$-by-$k_h$ matrix of 1s.

13. The non-transitory computer readable medium according to claim 9, wherein the membership matrices comprise clusterings of content anchor text, uniform resource locators (URLs), and hyperlinks of hyperlinked documents.

14. The non-transitory computer readable medium according to claim 9, wherein the automated system computes an algorithm comprising:

---
1: Initialize $M, S^{(1)}, \ldots, S^{(r)}$,
2: while convergence criterion of M is not satisfied do
3:    for h = 1 to r do
4:       while convergence criterion of S(h) is not satisfied do
5:          $S^{(h)} \leftarrow S^{(h)} \odot ((M^{(h)})^T M + \beta k 1_{khkh})/(D+\epsilon)$
6:       end while
7:    end for
8:    $M = 1/r \sum_{h=1}^{r} M^{(h)} S^{(h)}$
9: end while

--- where:
$\alpha$ is a constant $\geq 0$, selected to enforce a column-sparseness constraint, and
$\beta$ is a scaling constant $\geq 0$, for scaling a penalty term added to a consensus function $f(M, S^{(1)}, S^{(2)}, \ldots, S^{(r)})$ to deal with an external constraint $$\sum_j S_{ij}^{(h)} = 1$$

efficiently,
k denotes the number of clusters,
$1_{khkh}$ denotes a $k_h$-by-$k_h$ matrix of 1s, and
$\epsilon$ is a very small positive number used to avoid dividing by 0.

15. A method for combining multiple clusterings from a plurality of membership matrices into a consensus clustering and correspondence matrices, comprising:
iteratively computing the consensus clustering and correspondence matrices with an automated processor, from the plurality of membership matrices by minimization of an objective function comprising at least an consensus function, a term to enforce a column sparseness constraint, and a term to enforce a matrix row sum constraint, until predetermined convergence conditions are achieved, until predetermined convergence conditions are satisfied; and
storing the computed consensus clustering and the correspondence matrices in a memory.

16. The method according to claim 15, wherein the consensus function comprises a Euclidean distance.

17. The method according to claim 15, wherein said iteratively computing comprises:
iteratively computing from r membership matrices $M^{(1)} \in \mathbb{R}^{n \times k_1}, \ldots, M^{(r)} \in \mathbb{R}^{n \times k_r}$, and $k \in \mathbb{Z}^+$, the consensus clustering represented by $M \in \mathbb{R}^{n \times k}$ and the r correspondence matrices $S^{(1)} \in \mathbb{R}^{k_1 \times k}, \ldots, S^{(h)} \in \mathbb{R}^{k_h \times k}$,
by minimization of an objective function comprising a consensus function f,
updating $S^{(h)}$ using update rule:

$$S^{(h)} \leftarrow S^{(h)} - \Theta \odot \left( \frac{\partial f}{\partial S^{(h)}} \right)$$

until predetermined convergence conditions are achieved, wherein $\odot$ denotes the Hadamard product of two matrices, $\Theta$ is a matrix of step size parameters, and updating M using update rule:

$$M \leftarrow M = \frac{1}{r} \sum_{h=1}^{r} M^{(h)} S^{(h)}$$

until predetermined convergence conditions are achieved.

18. The method according to claim 17, wherein $$S = \arg\min_Y \|M - M^{(0)} Y\|^2,$$

where $\|\cdot\|$ denotes Frobenius matrix norm, and the objective function comprises a function of:
the consensus function f,
a term $$\alpha \sum_{h=1}^{r} \|S^{(h)} - (1/k_h) 1_{khkh} S^{(h)}\|^2$$

to enforce the column sparseness constraint, and
a penalty term $$\beta \sum_{h=1}^{r} \|S^{(h)} 1_{kk} - 1_{khk}\|^2$$

added to the consensus function to implement a constraint $$\sum_j S_{ij}^{(h)} = 1,$$

where $\alpha$ and $\beta$ are constants $\geq 0$, k denotes the number of clusters, and $1_{khkh}$ denotes a $k_h$-by-$k_h$ matrix of 1s.

19. The method according to claim 15, wherein:

$$\Theta = \frac{S^{(h)}}{2D}, \text{ and}$$

$$D = (M^{(h)})^T M^{(h)} S^{(h)} - \alpha S^{(h)} + \frac{\alpha}{k_h} 1_{k_h k_h} S^{(h)} + \beta k S^{(h)} 1_{kk},$$

such that the updating rule for $S^{(h)}$ is:

$$S^{(h)} \leftarrow S^{(h)} \odot \frac{(M^{(h)})^T M + \beta k 1_{k_h k}}{D + \varepsilon},$$

where:
$\alpha$ is a constant $\geq 0$, selected to enforce a column-sparseness constraint, and
$\beta$ is a scaling constant $\geq 0$, for scaling a penalty term added to a consensus function $f(M, S^{(1)}, S^{(2)}, \ldots, S^{(r)})$ to deal with an external constraint $$\sum_j S_{ij}^{(h)} = 1$$

efficiently,
k denotes the number of clusters,
$1_{khkh}$ denotes a $k_h$-by-$k_h$ matrix of 1s, and
$\epsilon$ is a very small positive number used to avoid dividing by 0.

20. The method according to claim 15, wherein the membership matrices comprise clusterings of content anchor text, uniform resource locators (URLs), and hyperlinks of hyperlinked documents.

* * * * *